United States Patent
Asakawa et al.

(12) 
(10) Patent No.: US 10,073,207 B2
(45) Date of Patent: Sep. 11, 2018

(54) DISPLAY DEVICE HAVING LIQUID CRYSTAL LAYER SEALED BETWEEN SEALING MEMBER, FIRST SUBSTRATE, AND SECOND SUBSTRATE

(71) Applicant: Japan Display Inc., Minato-ku (JP)

(72) Inventors: Youichi Asakawa, Tokyo (JP); Toshihiko Fukuma, Tokyo (JP); Ken Onoda, Tokyo (JP); Shinichi Komura, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 15/371,380

(22) Filed: Dec. 7, 2016

(65) Prior Publication Data

US 2017/0160458 A1 Jun. 8, 2017

(30) Foreign Application Priority Data

Dec. 7, 2015 (JP) ................. 2015-238444

(51) Int. Cl.
*G02F 1/1335* (2006.01)
*F21V 8/00* (2006.01)
(Continued)

(52) U.S. Cl.
CPC ......... *G02B 6/0025* (2013.01); *G02B 6/0036* (2013.01); *G02B 6/0068* (2013.01);
(Continued)

(58) Field of Classification Search
CPC ............... G02B 6/0025; G02B 6/0036; G02F 1/133615; G02F 1/13363; G02F 1/133308; G02F 1/133553; G02F 1/133502; G02F 2001/133618; G02F 2001/133567; G02F 2203/09; G02F 2001/133562; G02F 2001/133314
See application file for complete search history.

(56) References Cited

U.S. PATENT DOCUMENTS 5,600,462 A * 2/1997 Suzuki ............... F21V 5/02
349/112
6,118,503 A * 9/2000 Oki ................. G02B 6/003
349/65

(Continued)

FOREIGN PATENT DOCUMENTS

JP 2004-246100 9/2004
JP 2014082181 A * 5/2014 ............ G02B 6/003

*Primary Examiner* — Donald Raleigh
(74) *Attorney, Agent, or Firm* — Oblon, McClelland, Maier & Neustadt, L.L.P.

(57) ABSTRACT

In one embodiment, a display device includes first and second substrates, a liquid crystal layer, a polarizing element, a light source, and a bending member. The first substrate includes first and second surfaces and a side surface. The second substrate includes third and fourth surfaces. The polarizing element is provided on the fourth surface side of the second substrate. The light source irradiates the side surface with polarized parallel light. The bending member bends a path of the light entering the first substrate from the light source such that the light goes to the second substrate. No polarizing element is provided between the first substrate and the light source, and the bending member is provided on the second surface side of the first substrate.

20 Claims, 9 Drawing Sheets

(51) Int. Cl.
  *G02F 1/1333*  (2006.01)
  *G02F 1/13363* (2006.01)
  *G02F 1/1343*  (2006.01)

(52) U.S. Cl.
  CPC .... *G02F 1/13363* (2013.01); *G02F 1/133308*
      (2013.01); *G02F 1/133553* (2013.01); ***G02F
      1/133615*** (2013.01); *G02F 1/13362* (2013.01);
      *G02F 1/133345* (2013.01); *G02F 1/133502*
      (2013.01); *G02F 1/133504* (2013.01); *G02F
      1/133512* (2013.01); *G02F 1/133514*
      (2013.01); *G02F 1/133528* (2013.01); *G02F
      1/133617* (2013.01); *G02F 1/134309*
      (2013.01); *G02F 2001/13332* (2013.01); *G02F
      2001/133314* (2013.01); *G02F 2001/133519*
      (2013.01); *G02F 2001/133562* (2013.01);
      *G02F 2001/133567* (2013.01); *G02F
      2001/133618* (2013.01); *G02F 2001/133638*
      (2013.01); *G02F 2001/134345* (2013.01);
      *G02F 2201/121* (2013.01); *G02F 2201/123*
      (2013.01); *G02F 2202/28* (2013.01); *G02F
      2202/36* (2013.01); *G02F 2203/01* (2013.01);
      *G02F 2203/055* (2013.01); *G02F 2203/09*
      (2013.01)

(56) References Cited

U.S. PATENT DOCUMENTS

| | | | | |
|---|---|---|---|---|
| 2006/0262565 | A1* | 11/2006 | Shimura | G02B 6/0056 362/616 |
| 2007/0279551 | A1* | 12/2007 | Umebayashi | G02B 6/0053 349/65 |
| 2009/0190072 | A1* | 7/2009 | Nagata | G02B 6/0028 349/96 |
| 2010/0079704 | A1* | 4/2010 | Cho | G02F 1/133617 349/71 |
| 2011/0293856 | A1* | 12/2011 | Fukatani | C09K 19/2007 428/1.3 |
| 2013/0010229 | A1* | 1/2013 | Shin | G02F 1/133617 349/62 |
| 2015/0029700 | A1* | 1/2015 | Chen | G02F 1/133605 362/97.2 |
| 2016/0109633 | A1* | 4/2016 | Kida | G02B 6/001 349/62 |

* cited by examiner

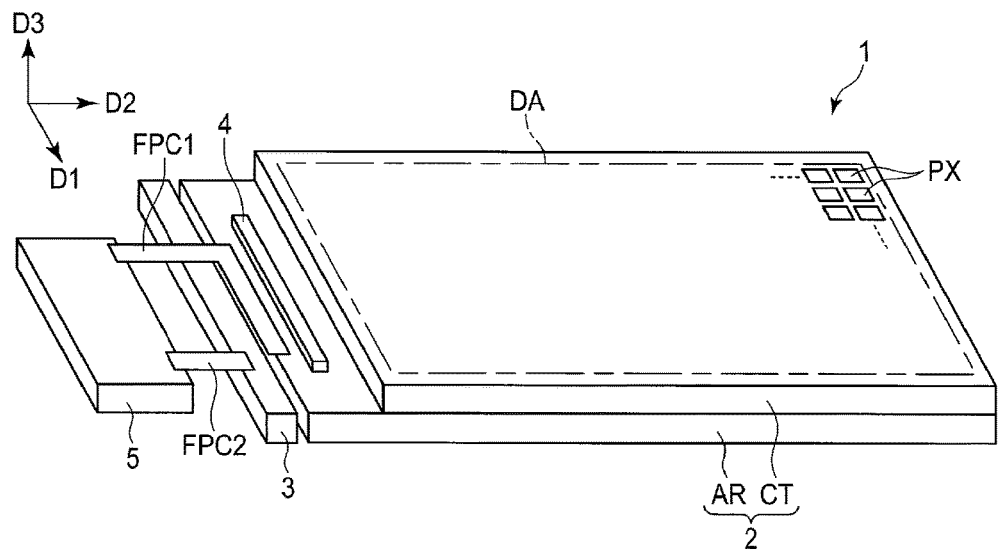
F I G. 1
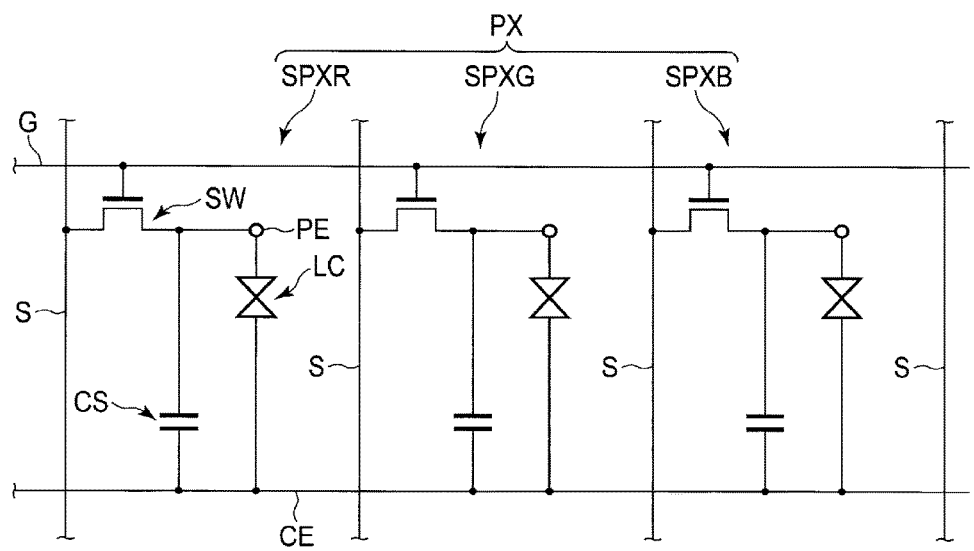
F I G. 2

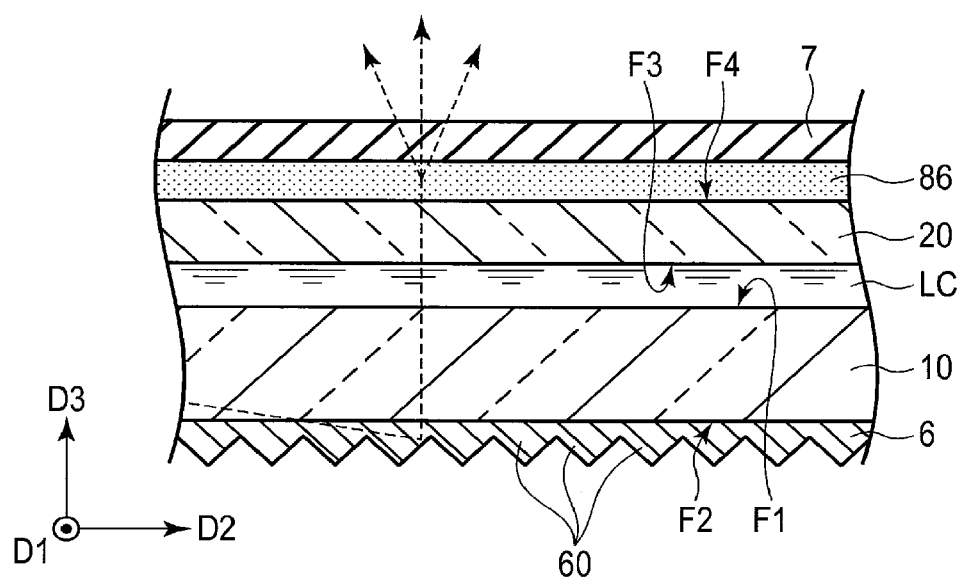
F I G. 7

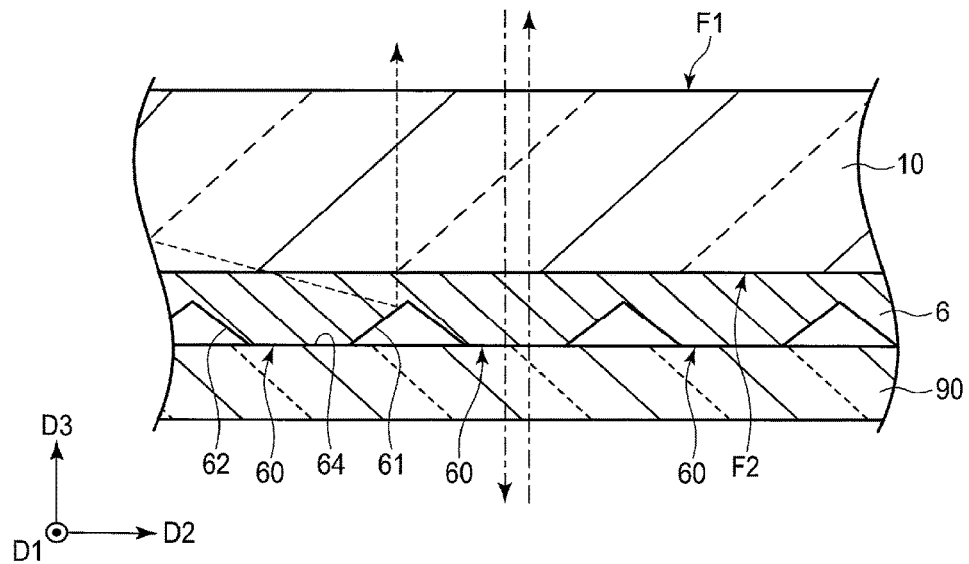
F I G. 9
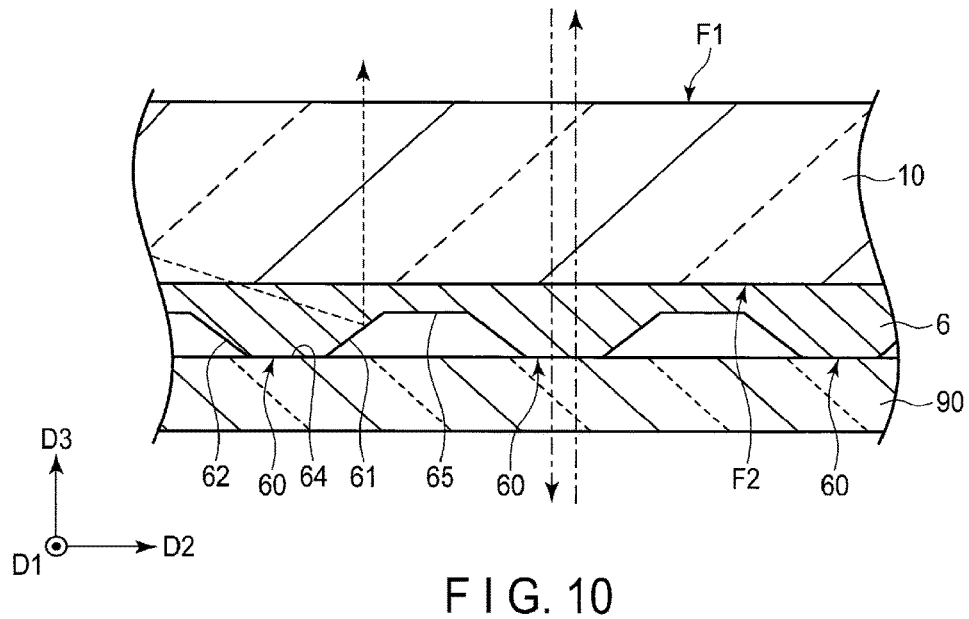
F I G. 10

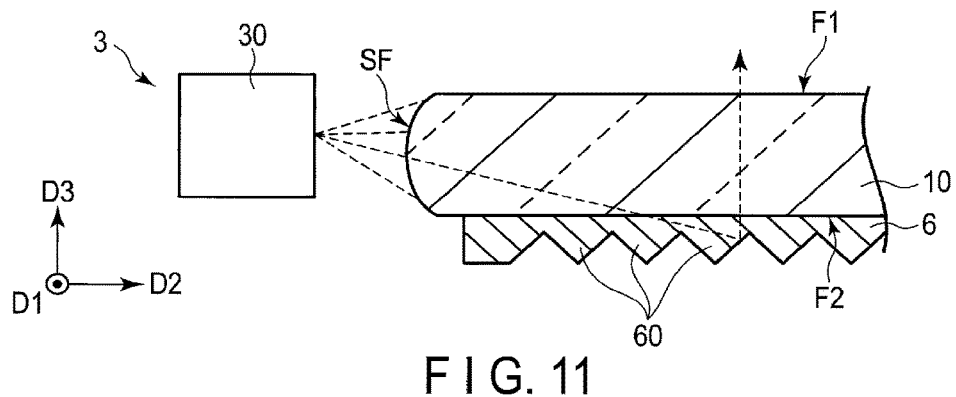
F I G. 11
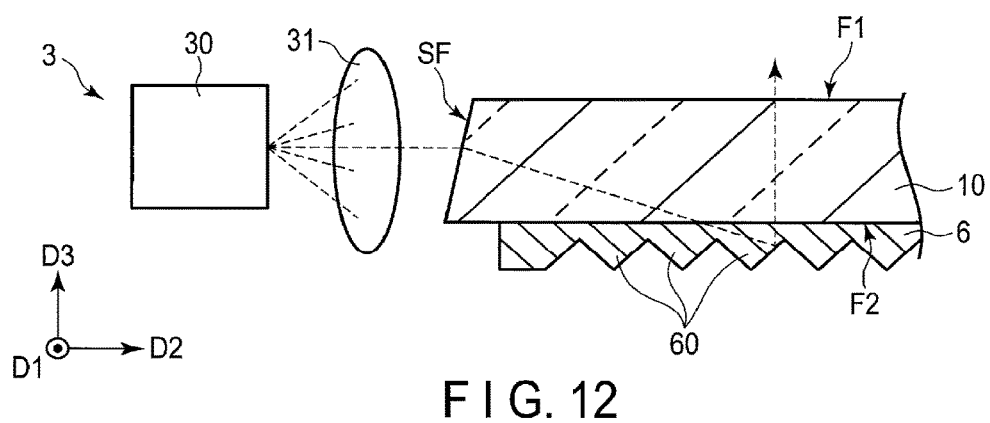
F I G. 12
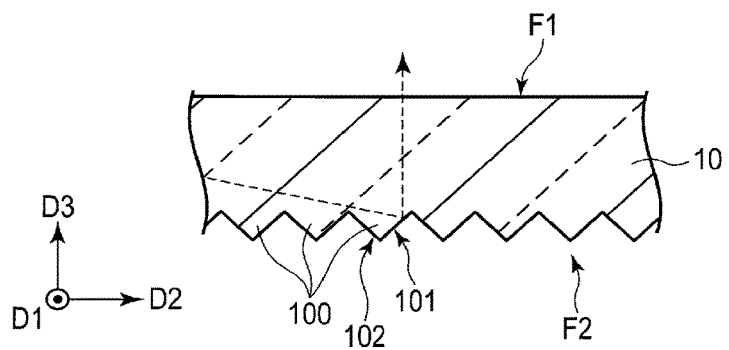
F I G. 13

DISPLAY DEVICE HAVING LIQUID
CRYSTAL LAYER SEALED BETWEEN
SEALING MEMBER, FIRST SUBSTRATE,
AND SECOND SUBSTRATE

CROSS-REFERENCE TO RELATED APPLICATIONS

This application is based upon and claims the benefit of priority from Japanese Patent Application No. 2015-238444, filed Dec. 7, 2015, the entire contents of which are incorporated herein by reference.

FIELD

Embodiments described herein relate generally to a display device.

BACKGROUND

In general, transmissive type display devices, for example, liquid crystal display devices, comprise a backlight including a light source and a lightguide plate, a liquid crystal cell, and a polarizer provided in each side of the liquid crystal cell. In the backlight, the light emitted from the light source enters the lightguide plate, and is emitted to the liquid crystal cell from the emission surface of the lightguide plate.

The lightguide plate is formed of a resin material such as polycarbonate. In the lightguide plate formed of such a material, the luminance on the emission surface may be reduced or non-uniform since the light emitted from the light source is partially absorbed. The shape of material of lightguide plate may be changed because of heat, load, moisture, etc. When the shape is changed, similarly, the luminance on the emission surface may be non-uniform. Moreover, the absorption of light in the lightguide plate depends on the wavelength. Thus, the color of light emitted from the emission surface may be shifted from the intended color. Further, the color may be non-uniform on the emission surface.

The light emitted from the emission surface of the lightguide plate is lost by two polarizers. To obtain an image with excellent brightness, the intensity of light source should be increased.

BRIEF DESCRIPTION OF THE DRAWINGS

FIG. 1 is a plan view schematically showing the structure of a liquid crystal display device according to a first embodiment.

FIG. 2 shows an example of the structure of each pixel provided in the liquid crystal display device.

FIG. 7 is a schematic cross-sectional view of a liquid crystal display device according to a third embodiment.

FIG. 9 shows an example of the structure applicable to a prism film provided in the liquid crystal display device according to the fourth embodiment.

FIG. 10 shows another example of the structure applicable to the prism film provided in the liquid crystal display device according to the fourth embodiment.

FIG. 11 is a schematic cross-sectional view showing a light source and a first substrate in a liquid crystal display device according to a fifth embodiment.

FIG. 12 is a schematic cross-sectional view showing another example of the light source and the first substrate in the liquid crystal display device according to the fifth embodiment.

FIG. 13 is a schematic cross-sectional view of a first substrate provided in a liquid crystal display device according to a sixth embodiment.

DETAILED DESCRIPTION

Figure 3:
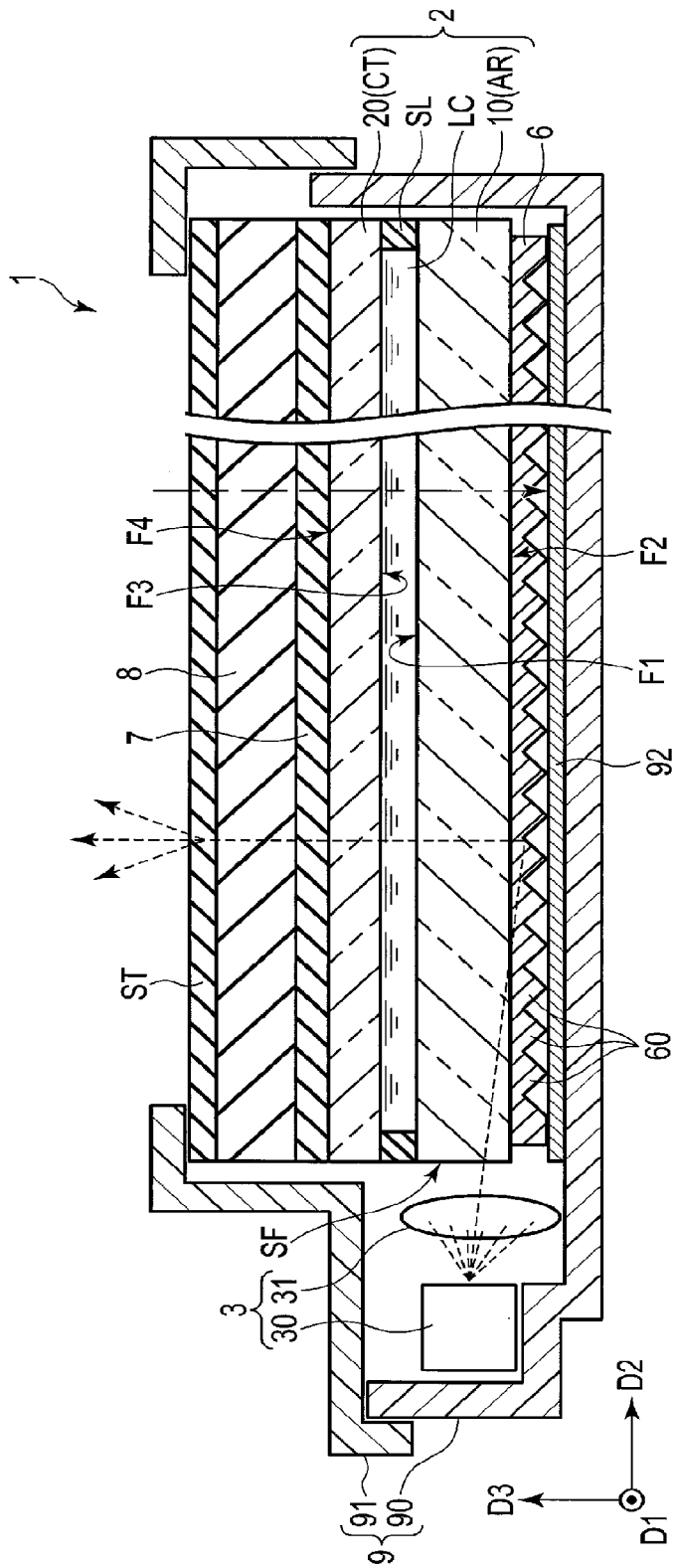
FIG. 3 schematically shows the structure of the cross-sectional surface of the liquid crystal display device.

In general, according to one embodiment, a display device comprises a phototransmissive first substrate, a phototransmissive second substrate, a liquid crystal layer, a polarizing element, a light source, and a bending member. The first substrate comprises a first surface, a second surface opposite to the first surface, and a side surface connecting the first surface and the second surface. The second substrate includes a third surface facing the first surface of the first substrate, and a fourth surface opposite to the third surface. The liquid crystal layer is provided between the first substrate and the second substrate. The polarizing element is provided on the fourth surface side of the second substrate. The light source irradiates the side surface of the first substrate with polarized parallel light. The bending member bends a path of the parallel light entering the first substrate from the light source such that the parallel light goes to the second substrate. In the display device, no polarizing element is provided between the first substrate and the light source, and the bending member is provided on the second surface side of the first substrate.

Various embodiments will be described hereinafter with reference to the accompanying drawings.

The disclosure is merely an example, and proper changes in keeping with the spirit of the invention, which are easily conceivable by a person of ordinary skill in the art, come within the scope of the invention as a matter of course. In addition, in some cases, in order to make the description clearer, the drawings are schematically shown rather than as an accurate representation of what is implemented. However, such schematic illustration is merely exemplary, and in no way restricts the interpretation of the invention. In the drawings, reference numbers of continuously arranged elements equivalent or similar to each other are omitted in some cases. In addition, in the specification and drawings, structural elements which function in the same or a similar manner to those described in connection with preceding drawings are denoted by like reference numbers, detailed description thereof being omitted unless necessary.

In each embodiment, as an example of display devices, a transmissive type liquid crystal display device is disclosed. However, each embodiment does not prevent application of individual technical ideas disclosed in the embodiment to other types of display devices. Other types of display devices include, for example, a display device comprising a mechanical display cell in which a microelectromechanical systems (MEMS) shutter functions as an optical element, and a display device comprising an electronic paper display cell comprising an electrophoretic element.

First Embodiment

FIG. 1 is a plan view schematically showing the structure of a liquid crystal display device 1 according to a first embodiment. The liquid crystal display device 1 may be used for various devices such as a smartphone, a tablet, a mobile phone, a personal computer, a television receiver, an in-vehicle device, a game console or a wearable device.

The liquid crystal display device 1 comprises a liquid crystal cell 2, a light source 3, a drive IC chip 4 which drives the liquid crystal cell 2, a control module 5 which controls the operations of the liquid crystal cell 2 and the light source 3, and flexible circuit boards FPC1 and FPC2 which transmit a control signal to the liquid crystal cell 2 and the light source 3.

In the present embodiment, a first direction D1, a second direction D2 and a third direction D3 are defined as shown in FIG. 1. The first direction D1 is parallel to, for example, the short sides of the liquid crystal cell 2. The second direction D2 is parallel to, for example, the long sides of the liquid crystal cell 2. The third direction D3 intersects with the first and second directions D1 and D2. In the example shown in FIG. 1, the first to third directions D1 to D3 perpendicularly intersect with each other. However, the first to third directions D1 to D3 may intersect with each other at other angles.

The liquid crystal cell 2 comprises an array substrate AR, a counter-substrate CT facing the array substrate AR, and a liquid crystal layer (the liquid crystal layer LC described later) provided between the array substrate AR and the counter-substrate CT. The liquid crystal cell 2 comprises a display area DA which displays an image. The liquid crystal cell 2 comprises, for example, a plurality of pixels PX arranged in matrix in the first and second directions D1 and D2 in the display area DA.

In the example of FIG. 1, the light source 3 is provided along the short sides of the array substrate AR. However, the light source 3 may be provided along a different side of the array substrate AR.

The drive IC chip 4 is mounted on, for example, the array substrate AR. However, the drive IC chip 4 may be mounted on, for example, the control module 5. Flexible circuit board FPC1 connects the array substrate AR and the control module 5. Flexible circuit board FPC2 connects the light source 3 and the control module 5.

FIG. 2 shows an example of the structure of each pixel PX. In the example of FIG. 2, the pixel PX comprises three subpixels SPX (SPXR, SPXG and SPXB) corresponding to red (R), green (G) and blue (B), respectively. The structure of the pixel PX is not limited to this example. For example, the pixel PX may further comprise a subpixel SPX corresponding to white. The pixel PX may comprise a plurality of subpixels SPX corresponding to the same color.

Each subpixel SPX comprises a switching element SW formed as, for example, a thin-film transistor (TFT), and a pixel electrode PE. The switching element SW is electrically connected to a scanning line G supplied with a scanning signal, a signal line S supplied with a video signal, and the pixel electrode PE. The pixel electrode PE forms retention capacity CS between the pixel electrode PE and a common electrode CE provided over a plurality of subpixels SPX. The pixel electrode PE and the common electrode CE are formed of a transparent conductive material such as indium tin oxide (ITO).

When a scanning signal is supplied to the scanning line G connected to a switching element SW, and further when a video signal is supplied to the signal line S connected to the switching element SW, voltage based on the video signal is applied to the pixel electrode PE. At this time, an electric field is generated between the pixel electrode PE and the common electrode CE. This electric field changes the initial alignment state of liquid crystal molecules of the liquid crystal layer LC in which no voltage is applied. By controlling the voltage applied to the pixel electrode PE of each subpixel SPX included in the display area DA, a color image using the light emitted from the light source 3 is displayed in the display area DA.

Figure 4:
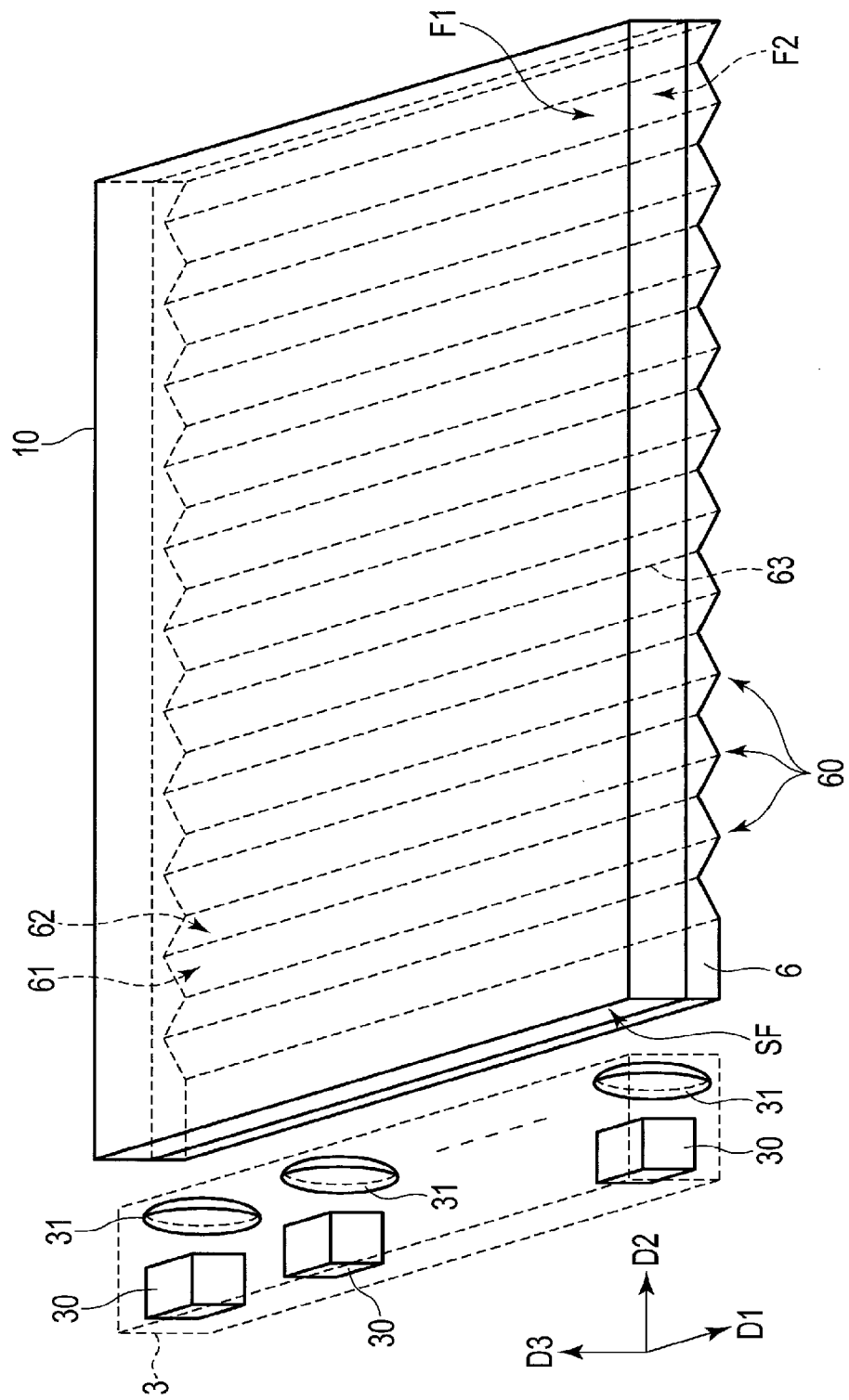
FIG. 4 shows examples of a light source, a first substrate and a prism film in the liquid crystal display device.
Figure 5:
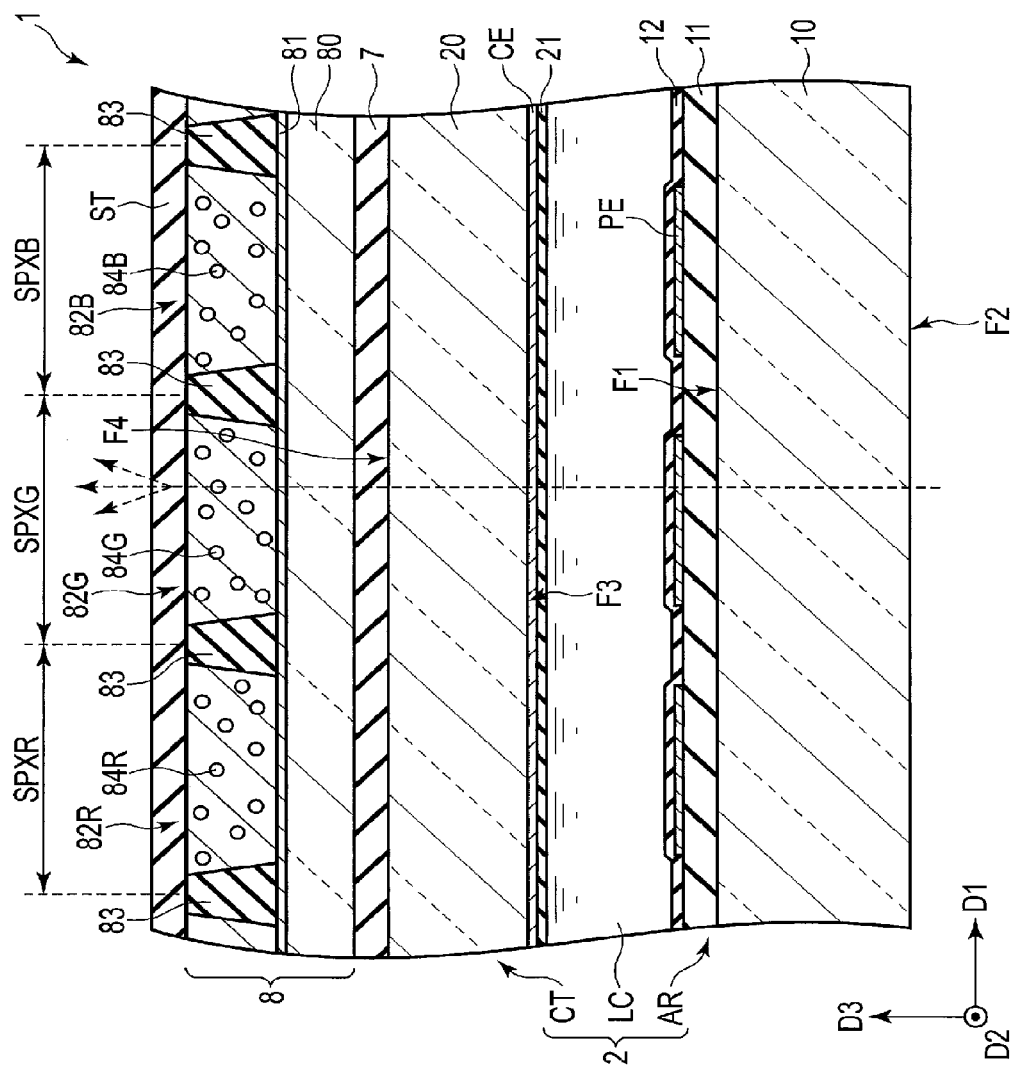
FIG. 5 shows examples of structures applicable to a display cell and an emitting layer in the liquid crystal display device.

Now, this specification explains the details of the liquid crystal display device 1 with reference to FIG. 3 to FIG. 5.

FIG. 3 schematically shows the structure of the cross-sectional surface of the liquid crystal display device 1. The array substrate AR comprises a first substrate 10 which is a phototransmissive glass substrate. In the same manner, the counter-substrate CT comprises a second substrate 20 which is a phototransmissive glass substrate. The array substrate AR and the counter-substrate CT comprise elements (for example, the elements shown in FIG. 5) other than the first or second substrate 10 or 20. However, these elements are omitted in FIG. 3. The present embodiment assumes that the first and second substrates 10 and 20 are glass substrates. However, these substrates may be formed of a resin material such as phototransmissive acrylic resin.

The first substrate 10 comprises a first surface F1, and a second surface F2 on a side opposite to the first surface F1. The second substrate 20 comprises a third surface F3, and a fourth surface F4 on a side opposite to the third surface F3. The first to fourth surfaces F1 to F4 are parallel to, for example, the first and second directions D1 and D2. The array substrate AR is attached to the counter-substrate CT with a sealing member SL such that the first surface F1 faces the third surface F3. The sealing member SL is formed around the display area DA in a circular pattern. The liquid crystal layer LC is sealed in the space defined by the array substrate AR, the counter-substrate CT and the sealing member SL.

The light source 3 comprises a light-emitting element 30 which emits polarized light, and a lens 31. The light-emitting element 30 faces a side surface SF of the first substrate 10. The lens 31 is provided between the light-emitting element 30 and the side surface SF. The side surface SF connects the first surface F1 and the second surface F2. In the present embodiment, the side surface SF is an end face of the first substrate 10 in the first direction D1.

In the present embodiment, the light-emitting element 30 is a point light source which emits diverging light spreading on the basis of the second direction D2. For the light-emitting element 30, for example, a laser element such as a semiconductor laser emitting polarized laser light may be used. The lens 31 converts the light emitted from the light-emitting element 30 into parallel light, and irradiates the side surface SF of the first substrate 10 with the light. For the lens 31, for example, a Fresnel lens or a diffractive lens may be used. However, the type of lens 31 is not particularly limited. The lens 31 must convert the light emitted from the light-emitting element 30 into parallel light in the cross-sectional surface parallel to the second and third directions D2 and D3 as shown in FIG. 3. The light which passed through the lens 31 may have a stretch in a plan view.

In the present embodiment, the light source 3 produces parallel light, using the light-emitting element 30 as a point light source and the lens 31. However, the light source 3 may comprise, for example, a light-emitting element comprising a linear emitting surface which is long in the first direction D1. The light-emitting element 30 is not limited to the above element which emits laser light. For example, the light-emitting element 30 may be a light-emitting diode which emits polarized light.

Parallel light is also called collimated light. Parallel light substantially travels in a straight line, and has high directivity. In this disclosure, parallel light is not limited to light whose rays are strictly parallel. Parallel light includes light slightly having a stretch.

In addition to the liquid crystal cell 2 and the light source 3, the liquid crystal display device 1 comprises a prism film 6, a polarizer (polarizing element) 7, an emitting layer 8, a diffusion layer ST, and a frame 9. The prism film 6 is attached to the second surface F2 of the first substrate 10. The prism film 6 comprises a plurality of prisms 60 which project in a direction away from the second surface F2 (in other words, in the downward direction in the figure). The prisms 60 are examples of bending members which cause the path of light emitted from the light source 3 to bend. The polarizer 7 is attached to the fourth surface F4 of the second substrate 20. The emitting layer 8 is provided on the polarizer 7. The diffusion layer ST is provided on the emitting layer 8.

In the present embodiment, the liquid crystal display device 1 does not comprise any polarizing element other than the polarizer 7. No polarizing element is provided between the first substrate 10 and the light source 3 or between the first substrate 10 and the liquid crystal layer LC.

The frame 9 includes a back bezel (supporting portion) 90, and a front bezel 91. The back bezel 90 and the front bezel 91 are formed of, for example, a light-shielding resin material. In the example of FIG. 3, the back bezel 90 covers the light source 3 and the rear surface (the prism film 6 side) and the side surface of the liquid crystal cell 2. The front bezel 91 mainly covers the light source 3 and the peripheral border of the front surface (the emitting layer 8 side) of the liquid crystal cell 2. The liquid crystal cell 2, the prism film 6, the polarizer 7, the emitting layer 8 and the diffusion layer ST are held by the back bezel 90 and the front bezel 91. The light-emitting element 30 and the lens 31 are secured to, for example, the back bezel 90 in the space defined between the back bezel 90 and the front bezel 91.

The front bezel 91 comprises an opening corresponding to the display area DA. The back bezel 90 does not comprise such an opening. Thus, the back bezel 90 covers the whole rear surface of the liquid crystal cell 2.

In the example of FIG. 3, the back bezel 90 comprises an antireflective layer 92. The antireflective layer 92 is formed on the inner surface (facing the prism film 6) of the main part of the back bezel 90. The antireflective layer 92 is a sheet formed of, for example, light-absorptive black resin. The antireflective layer 92 faces the prisms 60 of the prism film 6. In the example of FIG. 3, the ends of the prisms 60 are in contact with the antireflective layer 92.

The antireflective layer 92 prevents reflection of outside light entering through the opening of the front bezel 91 as shown by the alternate long and short dash arrow in the figure. The back bezel 90 may be formed of an antireflective material instead of providing the reflective layer 92. The antireflective layer 92 may not be provided. As the antireflective layer 92, a quarterwave plate may be used. In this case, the outside light entering the liquid crystal display device 1 becomes linearly polarized light in the polarizer 7, and becomes circularly polarized light in the antireflective layer 92 as a quarterwave plate. When the circularly polarized light is reflected in the back bezel 90, the direction of rotation is reversed. The circularly polarized light passes through the antireflective layer 92 again, and becomes linearly polarized light perpendicular to the incident light. This linearly polarized light is absorbed by the polarizer 7. Thus, the reflective light is invisible.

FIG. 4 shows specific examples of the light source 3, the first substrate 10 and the prism film 6. The light source 3 comprises a plurality of sets each including the light-emitting element 30 and the lens 31. The sets each including the light-emitting element 30 and the lens 31 are arranged in the first direction D1. The light-emitting elements 30 are mounted on the interconnection substrate connected to flexible circuit board FPC2. The light source 3 may comprise only one set including the light-emitting element 30 and the lens 31.

In the example of FIG. 4, each prism 60 comprises an inclined surface 61 facing the direction of the light source 3, and an inclined surface 62 facing a direction opposite to that of the light source 3. Inclined surfaces 61 and 62 are flat surfaces extending in parallel with the first direction D1 and intersecting with the second and third directions D2 and D3. Inclined surfaces 61 and 62 are inclined with respect to the first and second surfaces F1 and F2 of the first substrate 10.

The shape of each prism 60 is not limited to the example shown in FIG. 4. For example, each prism 60 may have a fan shape such that the distance from the lenses 31 which are the sources of irradiation of light is the same at every portion. In this case, inclined surfaces 61 and 62 are curved. The shapes of the prisms 60 or the thickness of the prism film 6 may be nonuniform, and may be different at least at a position. For example, the distance from the second surface F2 to each valley portion 63 provided between the prisms 60 may increase as the position is closer to the light source 3. This structure can be realized by, for example, reducing the thickness of the prism film 6 as the position is away from the light source 3 without changing the shape of each prism 60.

The present embodiment assumes that the emitting layer 8 comprises a phosphor, and the light emitted from the light-emitting element 30 is excitation light having a wavelength exciting the phosphor. In FIG. 3, an example of path of light which is emitted from the light-emitting element 30 and exits from the emitting layer 8 is shown by the dashed lines. The light emitted from the light-emitting element 30 is converted into parallel light in the lens 31, and enters the first substrate 10 through the side surface SF. This light passes through the first substrate 10, enters the prism film 6, and is emitted to the prisms 60. The light emitted to the prisms 60 is reflected to the second substrate 20 on the inclined surfaces (mainly on inclined surfaces 61) of the prisms 60. The reflected light passes through the first substrate 10, the liquid crystal layer LC and the second substrate 20, and reaches the polarizer 7.

The light emitted from the light-emitting element 30 is excitation light oscillating in a direction parallel to the absorption axis of the polarizer 7. When the light passes through a subpixel SPX in which no voltage is applied between the pixel electrode PE and the common electrode CE, the state of polarization is not changed in the liquid crystal layer LC. The light is absorbed by the polarizer 7. When the light passes through a subpixel SPX in which voltage is applied between the pixel electrode PE and the common electrode CE, the state of polarization of emitted light is changed. At least part of light is transmitted through the polarizer 7. The phosphor of the emitting layer 8 is excited by the light transmitted through the polarizer 7. The light emitted from the excited phosphor is diffused in the diffusion layer ST. In this way, visible light in a color corresponding to the subpixel SPX is emitted.

In the example of FIG. 3, the emitting element 30 and the lens 31 are out of alignment in the third direction D3 such that the center of light emitted from the light-emitting element 30 is located on the upper side on the basis of the center of the lens 31. With this structure, the parallel light emitted from the lens 31 is inclined to the second surface F2. Thus, the whole prism film 6 can be irradiated with the parallel light. However, the center of light emitted from the light-emitting element 30 may be aligned with the center of the lens 31. By inclining the light-emitting element 30 and the lens 31, the whole prism film 6 can be irradiated with the parallel light emitted from the lens 31. Thus, similar effects can be obtained.

Examples of structures applicable to the liquid crystal cell 2 and the emitting layer 8 are explained with reference to the schematic cross-sectional view of FIG. 5. The examples of FIG. 5 schematically show the structures of subpixels SPXR, SPXG and SPXB. In FIG. 5, the scanning lines G, the signal lines S and the switching element SW on the array substrate AR are omitted.

In addition to the first substrate 10, the array substrate AR comprises an insulating layer 11, a first alignment film 12, and the above pixel electrode PE. The insulating layer 11 is formed on the first surface F1 of the first substrate 10. In FIG. 5, the insulating layer 11 is shown as a single layer. However, the actual insulating layer 11 includes a plurality of layers for forming the scanning lines G, the signal lines S, the switching elements SW, etc. The pixel electrode PE is formed on the insulating layer 11 on the counter-substrate CT side. The first alignment film 12 covers the insulating layer 11 and the pixel electrode PE.

In addition to the second substrate 20, the counter-substrate CT comprises a second alignment film 21 and the above common electrode CE. The common electrode CE is formed on the third surface F3 of the second substrate 20. The second alignment film 21 covers the common electrode CE. The liquid crystal layer LC is sealed between the first alignment film 12 and the second alignment film 21.

In FIG. 5, an electric field parallel to the third direction D3 is mainly generated between the pixel electrode PE and the common electrode CE such that the alignment state of liquid crystal molecules of the liquid crystal layer LC is selectively changed using the electric field. However, the liquid crystal cell 2 may have a structure in which the alignment state of liquid crystal molecules of the liquid crystal layer LC is selectively changed mainly by the electric field parallel to the first and second directions D1 and D2. In this case, the common electrode CE is provided in the same layer as or a layer different from the pixel electrode PE on the array substrate AR.

The emitting layer 8 comprises a phototransmissive transparent substrate 80, a reflective layer 81 which reflects visible light, and a phosphor layer 82. The transparent substrate 80 is attached to the polarizer 7. The reflective layer 81 covers a surface of the transparent substrate 80. On the surface, the phosphor layer 82 is provided. Specifically, a phosphor layer 82R which absorbs excitation light and emits red light is provided in subpixel SPXR. A phosphor layer 82G which absorbs excitation light and emits green light is provided in subpixel SPXG. A phosphor layer 82B which absorbs excitation light and emits blue light is provided in subpixel SPXB.

In the example of FIG. 5, banks 83 are provided in the boundaries of subpixels SPXR, SPXG and SPXB. In the areas defined by the banks 83, phosphor layers 82R, 82G and 82B are provided. Each bank 83 is formed of, for example, light-shielding black resin. The emitting layer 8 may not comprise any bank 83.

The phosphor layer 82 includes a phosphor 84. In the example of FIG. 5, phosphor layers 82R, 82G and 82B include phosphors 84R, 84G and 84B, respectively. For phosphors 84R, 84G and 84B, known phosphors can be applied. For example, quantum dots which receive light from the light source 3 and emit red light, green light and blue light may be used. The quantum dots are, for example, semiconductor particles, and are allowed to produce light with various wavelengths by adjusting the particle size. Phosphors 84R, 84G and 84B may be quantum dots which emit light whose colors are the same. In this case, when the resin materials as the base materials of phosphor layers 82R, 82G and 82B are colored red, green and blue, respectively, it is possible to obtain red visible light, green visible light and blue visible light from the respective phosphor layers.

When the above phosphor layer 82 is used, for example, the light emitted from the light-emitting element 30 may be ultraviolet light, and the phosphor which receives ultraviolet light and emits light may be the phosphor 84. In this case, for the reflective layer 81, a visible light reflective film which has a low reflectance and a low absorptance for ultraviolet light and has a high reflectance for visible light may be used. When such a reflective layer 81 is used, the loss of ultraviolet light from the liquid crystal cell 2 to the phosphor layer 82 is reduced, and further, the visible light emitted from the phosphor layer 82 to the liquid crystal cell 2 is reflected. Thus, the brightness of the display image can be enhanced.

The diffusion layer ST is formed on the phosphor layer 82. The diffusion layer ST includes a fine-lens structure in the diffusion particles and on the surface. Light which passes through the diffusion layer ST is diffused. It is possible to reduce the non-uniformity in in-plane luminance by providing the diffusion layer ST. When the light emitted from the light source 3 is collimated light having a high parallelism, the in-plane luminance is easily made nonuniform. This problem can be avoided when the diffusion layer ST is used. The degree of polarization of light may be reduced in the diffusion layer ST. However, there is no problem after the light passes through the polarizer 7. The diffusion particles are not especially limited as long as they can diffuse light. The diffusion particles may be either organic particles or inorganic particles. The diffusion particles are preferably inorganic particles. As the inorganic particles, inorganic oxide particles are desirable such as silica or alumina.

The excitation light emitted from the light-emitting element 30 may be visible light. For example, blue laser light may be used as the light emitted from the light-emitting element 30. In this case, phosphor layer 82B may not be provided. Alternatively, a diffusion layer which diffuses laser light may be formed in place of phosphor layer 82B. In this case, a diffusion layer may be also formed on phosphor layers 82G and 82R. The wavelength of light emitted from the light-emitting element 30 and the structure of the light-emitting layer 8 can be appropriately modified.

As explained above, the liquid crystal display device 1 of the present embodiment does not comprise a resinous light-guide plate used for common liquid crystal display devices, and causes the light emitted from the light source 3 to directly enter the first substrate 10. When a common light-guide plate is used, the luminance on the emission surface may be reduced or nonuniform due to absorption of light in the lightguide plate. The shape of material of lightguide plate may be changed because of heat, load, moisture, etc. In this case, similarly, the luminance on the emission surface may be nonuniform. Moreover, the absorption of light in the lightguide plate depends on the wavelength. Thus, the color of light emitted from the emission surface may be shifted from the intended color. Further, the color may be nonuniform on the emission surface. In the structure of the present embodiment, the light emitted from the light source 3 does not pass through any lightguide plate. Thus, it is possible to prevent reduction in luminance, non-uniformity in luminance, a shift of color and non-uniformity in color. In this way, the display quality of the liquid crystal display device 1 can be improved. When the first substrate 10 is formed of glass, the absorption of light is less, and further, the shape is difficult to change, in comparison with a resin material. Thus, it is possible to further desirably prevent reduction in luminance, non-uniformity in luminance, a shift of color and non-uniformity in color.

In the present embodiment, the light source 3 emits polarized light. In common liquid crystal display devices, a polarizer must be provided on each side of a liquid crystal cell. However, in the present embodiment, only the polarizer 7 must be provided. By decreasing the number of polarizers, the loss of light caused by the polarizers can be reduced, and further, the liquid crystal display device 1 can be thin.

The light emitted from the light source 3 is parallel light. Even a phototransmissive substrate such as the first substrate 10 is difficult to maintain the degree of polarization. Thus, there is a need to prevent reflection of light inside the first substrate 10 as much as possible. The angle at which parallel light goes to the prisms 60 can be easily controlled. Thus, the prisms 60 can be irradiated with parallel light without any reflection inside the first substrate 10 or with approximately one reflection. In this way, the light can be emitted from the first surface F1 of the first substrate 10 while the degree of polarization is maintained. Moreover, the less the number of reflections on the first substrate 10 is, the shorter the path of light is. Thus, it is possible to prevent absorption of light on the first substrate 10.

The path of light emitted from the light source 3 is long in the first substrate 10. However, the path of light is short in the second substrate 20 since the light mainly passes in a thickness direction. The loss of light in the first substrate 10 is further reduced as the transmittance of the first substrate 10 is increased. The necessity of increase in the transmittance of the first substrate 20 is lower than that of the first substrate 10. Thus, the transmittance of the first substrate 10 may be greater than that of the second substrate 20.

Since the light emitted from the light source 3 is introduced into the first substrate 10 through the side surface SF, the first substrate 10 must have a certain thickness. The first substrate 10 must have a sufficient thickness to incline the parallel light emitted from the light source 3 such that the prisms 60 are evenly irradiated with the parallel light. When the parallel light through the side surface SF has reached the boundary between the first substrate 10 and the prism film 6 at a less incident angle, the parallel light may be totally reflected on the boundary, and may not reach the prisms 60. The thickness of the second substrate 20 is not specified as long as the structural strength can be maintained. Thus, the thickness of the first substrate 10 may be greater than that of the second substrate 20 as shown in FIG. 3 and FIG. 5.

The refractive index of the first substrate 10 may be less than that of the prism film 6. With this structure, total reflection of parallel light emitted from the light source 3 is difficult to occur in the boundary between the first substrate 10 and the prism film 6. The refractive index of the second substrate 20 is not particularly limited. However, for example, the refractive index of the first substrate 10 may be less than that of the second substrate 20.

As described above, the display quality of the liquid crystal display device 1 can be further improved by appropriately determining the transmittance, thickness and refractive index of the first substrate 10.

In addition to the above explanation, various excellent effects can be obtained from the present embodiment.

Second Embodiment

In the first embodiment, the light emitted from the light source 3 is excitation light, and visible light is produced from the emitting layer 8 because of the excitation light. In a second embodiment, it is assumed that the light emitted from a light source 3 is visible light. The structures or effects which are not particularly discussed in the second embodiment are the same as those of the first embodiment.

Figure 6:
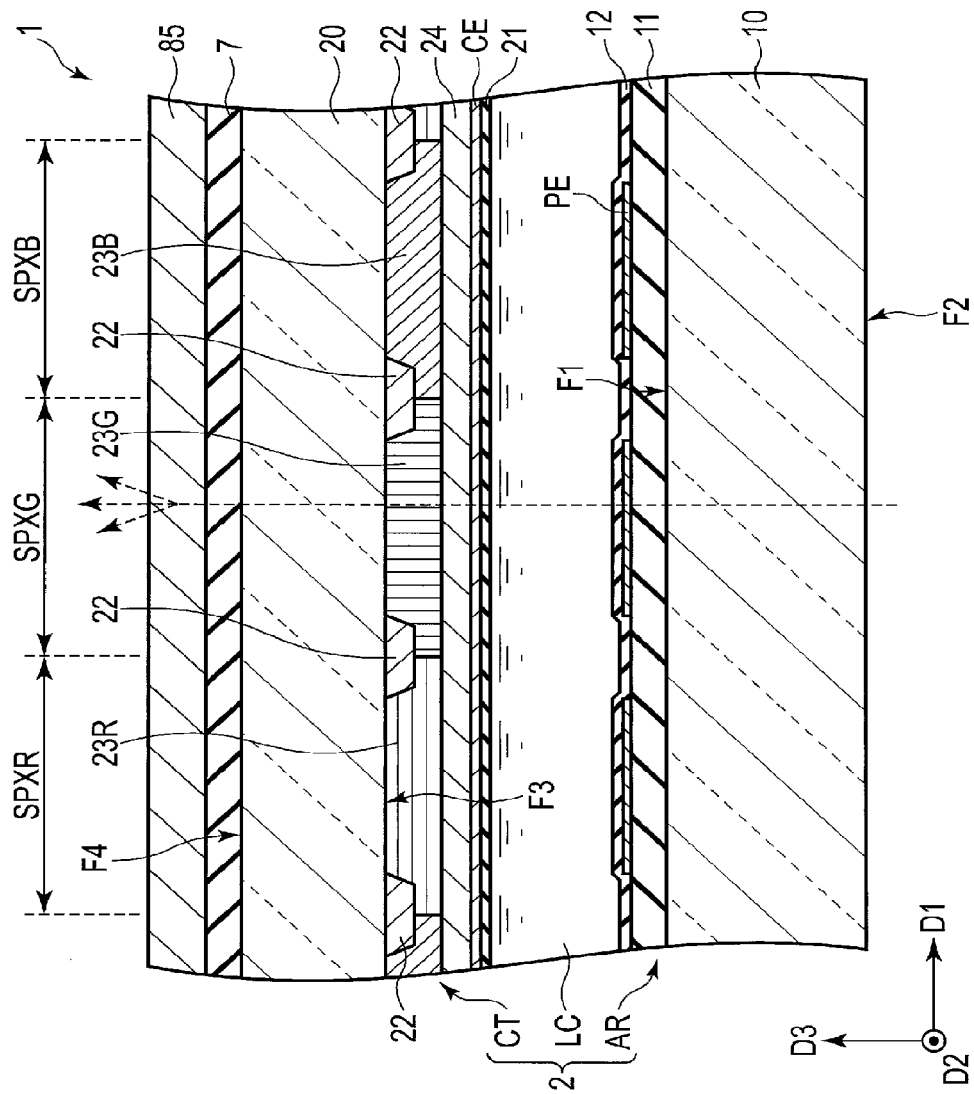
FIG. 6 is a schematic cross-sectional view of a liquid crystal display device according to a second embodiment.

FIG. 6 is a schematic cross-sectional view showing a structure applicable to a liquid crystal cell 2, etc., according to the present embodiment. The liquid crystal cell 2 of FIG. 6 is different from that of FIG. 5 in the structure of a counter-substrate CT. The counter-substrate CT further comprises a light-shielding layer 22, a color filter 23 and an overcoat layer 24.

The light-shielding layer 22 is formed on a third surface F3 of a second substrate 20, and separates one subpixel SPX from another subpixel SPX. The color filter 23 covers the third surface F3 and the light-shielding layer 22. The overcoat layer 24 covers the color filter 23. The asperities generated by the light-shielding layer 22 and the color filter 23 are planarized by the overcoat layer 24. A second alignment film 21 covers the overcoat layer 24.

FIG. 6 assumes that a pixel PX comprises subpixels SPXR, SPXG and SPXB corresponding to red, green and blue, respectively, in a manner similar to that of the example of FIG. 5. The color filter 23 includes a color filter 23R corresponding to red, a color filter 23G corresponding to green, and a color filter 23B corresponding to blue. Color filter 23R is provided in subpixel SPXR. Color filter 23G is provided in subpixel SPXG. Color filter 23B is provided in subpixel SPXB.

The pixel PX may further comprise a subpixel SPX corresponding to white, or may comprise a plurality of subpixels SPX corresponding to the same color. When the pixel PX comprises a subpixel SPX corresponding to white, the subpixel SPX may comprise a color filter corresponding to white, or may not comprise a color filter. When white light is emitted from the light source 3, the subpixel SPX corresponding to white is a transparent color filter. As explained in the first embodiment, a common electrode CE may be provided in the same layer as or a layer different from a pixel electrode PE on an array substrate AR. The color filter 23 may be provided on the array substrate AR.

In the example of FIG. 6, a diffusion layer 85 is provided in place of the emitting layer 8 shown in FIG. 5. Thus, the light which passed through a polarizer 7 and the color filter 23 is diffused.

The light emitted from the light source 3 is, for example, white. White light can be produced by, for example, preparing three light-emitting elements 30 which emit red polarized laser light, green polarized laser light and blue polarized laser light, respectively, and mixing the light emitted from the light-emitting elements 30 before incidence on a first substrate 10. Alternatively, prisms 60 may be irradiated with the light emitted from the light-emitting elements 30 at the same time such that the light reflected to a second substrate 20 from the prisms 60 is white.

The light emitted from the light source 3 bends in the prisms 60 and passes through the array substrate AR, a liquid crystal layer LC and the counter-substrate CT in a manner similar to that of the first embodiment. The light reaches the polarizer 7 as visible light in a color corresponding to the color filter 23. The light which passed through a subpixel SPX in which an electric field is formed between the pixel electrode PE and the common electrode CE is transmitted through the polarizer 7 without absorption, and is diffused in the diffusion layer 85. By diffusing the light in this manner, the viewing angle of an image displayed in a display area DA can be improved.

In the above structure of the present embodiment, in a manner similar to that of the first embodiment, it is possible to prevent reduction in luminance, non-uniformity in luminance, a shift of color and non-uniformity in color caused by a lightguide plate. Moreover, a liquid crystal display device 1 can be thin by decreasing the number of polarizers.

The present embodiment discloses that the color filter 23 is used to realize color image display. However, a field sequential system may be applied to the liquid crystal display device 1. In the system, no color filter is used. The red, green and blue light-emitting elements 30 are turned on at high speed in a time-divisional manner. In synchronization with this lighting, the image is switched at high speed. Thus, the images in colors are temporally mixed.

Third Embodiment

In a third embodiment, a modification example of the second embodiment is disclosed. The structures or effects which are not particularly discussed in the third embodiment are the same as those of the embodiments explained above.

FIG. 7 is a schematic cross-sectional view of a liquid crystal display device 1 according to a third embodiment. The liquid crystal display device 1 shown in FIG. 7 comprises a diffusion adhesive layer 86 in place of a diffusion layer 85. The diffusion adhesive layer 86 is provided between a fourth surface F4 of a second substrate 20 and a polarizer 7 such that the polarizer 7 adheres to the fourth surface F4.

The diffusion adhesive layer 86 diffuses light reflected on prisms 60. The light reflected on the prisms 60 passes through the diffusion adhesive layer 86 before reaching the polarizer 7. Thus, the diffusion adhesive layer 86 must maintain the state of polarization. The structure of the diffusion adhesive layer 86 having this function is not particularly limited. However, for example, the particles of dispersion polymers may be included in the resin as the base material. In this structure, when the light reflected on the prisms 60 is refracted in various directions by the difference in refractive index between the particles and the base material, light can be diffused without cancelling the state of polarization.

In the structure of the present embodiment, the adhesive layer with which the polarizer 7 adheres to the second substrate 20 functions to diffuse light reflected on the prisms 60. Thus, there is no need to provide a separate diffusion layer. In this way, the liquid crystal display device 1 can be thin. In addition to the above explanation, effects similar to those of the first and second embodiments can be obtained from the present embodiment.

Fourth Embodiment

A fourth embodiment discloses an example in which a liquid crystal display device 1 is structured as a transparent liquid crystal display device which can transmit outside light. The structures or effects which are not particularly discussed in the fourth embodiment are the same as those of the embodiments explained above.

Figure 8:
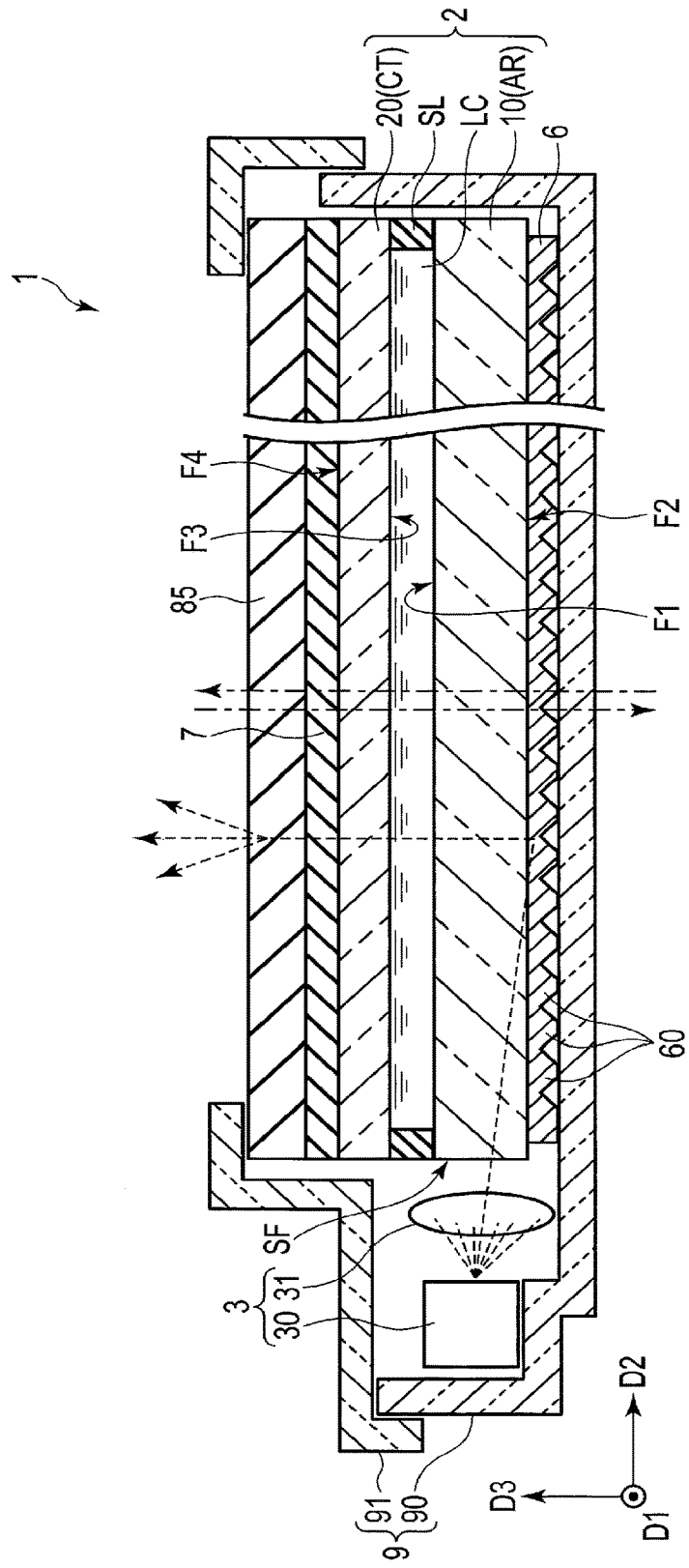
FIG. 8 is a schematic cross-sectional view of a liquid crystal display device according to a fourth embodiment.

FIG. 8 is a schematic cross-sectional view of the liquid crystal display device 1 according to the fourth embodiment. The liquid crystal display device 1 shown in FIG. 8 comprises a liquid crystal cell 2, a light source 3, a prism film 6, a polarizer 7, a diffusion layer 85 and a frame 9. From these elements, the liquid crystal cell 2, the light source 3, the prism film 6, the polarizer 7 and the diffusion layer 85 are the same as those of the second embodiment. Specifically, the light source 3 comprises light-emitting elements 30 which emit red polarized visible light, green polarized visible light and blue polarized visible light. The liquid crystal cell 2 comprises a color filter 23.

In the present embodiment, a back bezel 90 and a front bezel 91 included in the frame 9 are formed of a phototransmissive resin material. In the present embodiment, the back bezel 90 does not comprise the antireflective layer 92 shown in FIG. 3.

In this structure, the liquid crystal display device 1 transmits at least part of the outside light which enters the liquid crystal display device 1 from the rear side (back bezel 90 side) and the front side (diffusion layer 85 side) as shown by the alternate long and short dash arrows. Specifically, since the outside light is not polarized, approximately fifty percent is absorbed when the light passes through the polarizer 7. Further, the light is partially absorbed in the liquid crystal cell 2, etc. However, at least part of light is transmitted through the liquid crystal display device 1. The outside light which is transmitted through the liquid crystal display device 1 may be colored in the polarizer 7 and the color filter 23 of the liquid crystal cell 2. Thus, the liquid crystal display device 1 is visible in a translucent state in which the device is colored as a whole. The display image of the liquid crystal display device 1 may be also translucent such that the background is visible.

The transparency of the liquid crystal display device 1 may be reduced when the outside light is refracted or totally reflected on prisms 60. When the transparency of the liquid crystal display device 1 must be increased, the prism film 6 may be structured in some way to, for example, reduce the refraction of outside light.

FIG. 9 is shown for explaining an example of the structure applicable to the prism film 6. FIG. 9 shows a part of the cross-sectional surfaces of a first substrate 10, the prism film 6 and the back bezel 90. In the example of FIG. 9, each prism 60 comprises an inclined surface 61 (a first inclined surface) facing the direction of the light source 3, an inclined surface 62 (a second inclined surface) facing a direction opposite to that of the light source 3, and a flat surface 64 connecting inclined surfaces 61 and 62. Inclined surfaces 61 and 62 are, for example, flat surfaces extending in parallel with a first direction D1 and intersecting with second and third directions D2 and D3, and are inclined with respect to first and second surfaces F1 and F2 of the first substrate 10. Flat surface 64 is a flat surface parallel to the first and second directions D1 and D2. Flat surface 64 is also parallel to the first and second surfaces F1 and F2 and the inner surface of the back bezel 90.

In the example of FIG. 9, flat surface 64 is formed on the top portion of each prism 60. Flat surface 64 is in surface-contact with the back bezel 90. When flat surface 64 is in surface-contact with the back bezel 90, the liquid crystal cell 2, etc., can be stably supported by the frame 9.

The light emitted from the light source 3 is reflected on inclined surface 61 in the third direction D3 as shown by the dashed arrow. With regard to the outside light entering the liquid crystal display device 1 from the rear side (back bezel 90 side) and the front side (diffusion layer 85 side), the outside light perpendicularly passing through flat surface 64 is not refracted as shown by the alternate long and short dash arrows. Thus, the transparency of the liquid crystal display device 1 can be increased by the effect of the outside light passing through flat surface 64.

FIG. 10 shows another example of the structure applicable to the prism film 6. In the example of FIG. 10, each prism 60 comprises flat surface 64, and further, a flat surface 65 is formed between two adjacent prisms 60. Flat surface 65 is a flat surface parallel to the first and second directions D1 and D2, the first and second surfaces F1 and F2, the inner surface of the back bezel 90, etc., in the same manner as flat surface 64. The outside light perpendicularly passing through flat surface 65 is not refracted in the same manner as the outside light perpendicularly passing through flat surface 64. Thus, the transparency of the liquid crystal display device 1 can be increased by the effect of outside light passing through flat surfaces 64 and 65.

When the ratio of flat surfaces (flat surfaces 64 in FIG. 9 and flat surfaces 64 and 65 in FIG. 10) to inclined surfaces 61 and 62 is determined such that, for example, the area of flat surfaces is greater than that of inclined surfaces in a planar view of the prism film 6, the transparency of the liquid crystal display device 1 can be desirably increased. When the ratio of flat surfaces is excessively great, the luminance of light which enters the first substrate 10 from the light source 3 and exits through the first surface F1 is nonuniform. Thus, the specific ratio of flat surfaces to inclined surfaces 61 and 62 may be appropriately determined based on the performance required for the liquid crystal display device 1.

The present embodiment shows an example in which a transparent liquid crystal display device is realized on the basis of the liquid crystal display device 1 disclosed in the second embodiment. However, a transparent liquid crystal display device can be realized even on the basis of the liquid crystal display device 1 comprising the emitting layer 8 in the first embodiment. Specifically, a transparent liquid crystal display device can be realized by removing the antireflective layer 92, and further, forming the back bezel 90 and the front bezel 91 such that they are phototransmissive. When a transparent liquid crystal device is realized on the basis of the liquid crystal display device 1 to which the above field sequential system is applied, the liquid crystal cell 2 does not comprise a color filter. Thus, it is possible to reduce coloring of outside light transmitted through the liquid crystal display device 1.

The structures of the prism film 6 shown in FIG. 9 and FIG. 10 may be also applied to the liquid crystal display device 1 of each of the above embodiments.

The present embodiment shows an example in which both the back bezel 90 and the front bezel 91 are phototransmissive. However, only the back bezel 90 may be phototransmissive. Further, in the back bezel 90, only the area facing the liquid crystal cell 2 or the area facing a display area DA may be phototransmissive.

Fifth Embodiment

A fifth embodiment discloses a modification example applicable to the light source 3 and the side surface SF of the first substrate 10 of each of the above embodiments. The structures and effects which are not particularly discussed in the fifth embodiment are the same as those of the embodiments explained above.

FIG. 11 is a schematic cross-sectional view showing a modification example of a light source 3 and a side surface SF of a first substrate 10. The light source 3 shown in FIG. 11 does not comprise a lens 31. Instead, the side surface SF of the first substrate 10 is a curved surface having a lens shape, and has the same function as the lens 31. The polarized light emitted from a light-emitting element 30 directly enters the side surface SF. This light is converted into parallel light by the side surface SF, and is emitted to each prism 60 of a prism film 6. In this structure, the lens 31 is unnecessary. Thus, the structure of the light source 3 can be simplified.

FIG. 12 is a schematic cross-sectional view showing another modification example of the light source 3 and the side surface SF of the first substrate 10. The light source 3 shown in FIG. 12 comprises the lens 31 in a manner similar to that of the above embodiments. However, the light emitted from the lens 31 is light parallel to first and second surfaces F1 and F2. The side surface SF is an inclined surface such that the end portion on the second surface F2 side projects to the light source 3 in comparison with the end portion on the first surface F1 side. Thus, the light entering the side surface SF bends such that the light goes in the direction of the second surface F2. In this way, the prisms 60 are irradiated with the light.

In addition to the above explanation, the light source 3 and the side surface SF of the first substrate 10 may be modified in various ways.

Sixth Embodiment

A sixth embodiment discloses a structure in which a prism film 6 is unnecessary. This structure is applicable to all of the embodiments described above. The structures or effects which are not particularly discussed in the sixth embodiment are the same as those of the embodiments explained above.

FIG. 13 is shown for explaining the sixth embodiment. FIG. 13 schematically shows the cross-sectional surface of a first substrate 10. The first substrate 10 comprises prisms 100 on a second surface F2. Each prism 100 comprises an inclined surface 101 facing the direction of a light source 3, and an inclined surface 102 facing the direction opposite to that of the light source 3, in a manner similar to each prism 60 shown in, for example, FIG. 4. Inclined surfaces 101 and 102 are flat surfaces extending in parallel with a first direction D1 and intersecting with second and third directions D2 and D3. The light emitted from the light source 3 is reflected by inclined surface 101 of each prism 100 in the third direction D3.

When the prisms 100 are formed on the second surface F2 of the first substrate 10, no prism film 6 is required. Thus, the number of components of a liquid crystal display device 1 can be reduced.

Each prism 100 may comprise a flat surface in the top portion in a manner similar to that of the prisms 60 shown in FIG. 9. Moreover, a flat surface may be formed between two adjacent prisms 100 in a manner similar to that of the prisms 60 shown in FIG. 10.

When no prism film 6 is provided as shown in the present embodiment, for example, the end of each prism 100 is in contact with an antireflective layer 92 and the inner surface of a back bezel 90. When a flat surface is provided at the end of each prism 100, it is possible to stably support a liquid crystal cell 2, etc., by a frame 9.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. The structures disclosed in the embodiments can be appropriately combined with each other.

What is claimed is:

1. A display device comprising:
a phototransmissive first substrate comprising a first surface, a second surface opposite to the first surface, and a side surface connecting the first surface and the second surface;
a phototransmissive second substrate comprising a third surface facing the first surface of the first substrate, and a fourth surface opposite to the third surface;
a liquid crystal layer provided between the first substrate and the second substrate;
a sealing member attaching the first substrate to the second substrate;
a polarizing element provided on the fourth surface side of the second substrate;
a light source which irradiates the side surface of the first substrate with polarized parallel light; and
a bending member which bends a path of the parallel light entering the first substrate from the light source such that the parallel light goes to the second substrate, wherein
no polarizing element is provided between the first substrate and the light source,
the bending member is provided on the second surface side of the first substrate, and
the liquid crystal layer is sealed between the sealing member, the first substrate and the second substrate.

2. The display device of claim 1, wherein
the light source includes a light-emitting element, and a lens provided between the light-emitting element and the side surface of the first substrate,
the light-emitting element is a point light source which emits diverging light, and
the lens converts the light emitted from the light-emitting element into parallel light, and emits the light to the first substrate.

3. The display device of claim 1, wherein
the light source includes a light-emitting element,
the light-emitting element is a point light source which emits diverging light, and
the side surface of the first substrate has a lens shape for converting the light emitted from the light-emitting element into parallel light.

4. The display device of claim 1, further comprising a frame which supports the first substrate, the second substrate, the light source and the bending member, and
the frame comprises a supporting portion facing the bending member.

5. The display device of claim 4, wherein
the supporting portion is phototransmissive.

6. The display device of claim 4, wherein
the supporting portion comprises a quarterwave plate.

7. The display device of claim 1, further comprising a diffusion layer on the fourth surface side of the second substrate, the diffusion layer diffusing the parallel light.

8. The display device of claim 7, wherein
the polarizing element is provided between the diffusion layer and the second substrate.

9. The display device of claim 8, wherein
the diffusion layer is provided between the polarizing element and the second substrate, and
the polarizing element adheres to the fourth surface of the second substrate with the diffusion layer.

10. The display device of claim 1, wherein
the light source includes a light-emitting element which emits laser light.

11. The display device of claim 1, further comprising a reflective layer on the fourth surface side of the second substrate, the reflective layer reflecting visible light.

12. The display device of claim 1, wherein
the bending member is a prism which reflects the parallel light entering the first substrate to the second substrate.

13. The display device of claim 12, wherein
the prism comprises a flat surface parallel to the first surface of the first substrate, and an inclined surface inclined with respect to the first surface.

14. The display device of claim 12, wherein
the prism comprises a first inclined surface facing a direction of the light source, a second inclined surface facing a direction opposite to the direction of the light source, and a flat surface connecting the first inclined surface and the second inclined surface,
the first inclined surface and the second inclined surface are inclined with respect to the first surface, and
the flat surface are parallel to the first surface.

15. The display device of claim 12, further comprising a film attached to the second surface of the first substrate, wherein
the prism is formed in the film, and
the first substrate has a refractive index less than a refractive index of the film.

16. The display device of claim 1, wherein
a transmittance of the first substrate for the parallel light is greater than a transmittance of the second substrate for the parallel light.

17. The display device of claim 1, wherein
the first substrate is thicker than the second substrate.

18. The display device of claim 1, further comprising an emitting layer on the fourth surface side of the second substrate, wherein
the light emitted from the light source is excitation light, and
the emitting layer includes a phosphor which is excited by the excitation light emitted from the light source to emit light.

19. The display device of claim 18, further comprising a diffusion layer on the fourth surface side of the second substrate, the diffusion layer diffusing the light emitted from the emitting layer, wherein
the emitting layer is provided between the polarizing element and the diffusion layer.

20. The display device of claim 1, wherein
the bending member is formed on the second surface of the first substrate.

* * * * *